US009592602B2

(12) United States Patent
Dembeck

(10) Patent No.: US 9,592,602 B2
(45) Date of Patent: Mar. 14, 2017

(54) DRILL GUIDES FOR RIGHT ANGLE DRILLS

(71) Applicant: The Boeing Company, Huntington Beach, CA (US)

(72) Inventor: David M. Dembeck, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 14/526,878

(22) Filed: Oct. 29, 2014

(65) Prior Publication Data

US 2016/0121447 A1 May 5, 2016

(51) Int. Cl.
*B23Q 17/00* (2006.01)
*B25H 1/00* (2006.01)

(52) U.S. Cl.
CPC .................................. *B25H 1/0021* (2013.01)

(58) Field of Classification Search
CPC . A61B 17/1714; A61B 17/1764; A61B 17/16; A61B 17/17; B23Q 17/2275; B23B 47/00; B23B 47/28
USPC .................................................... 33/638, 430
See application file for complete search history.

(56) References Cited

U.S. PATENT DOCUMENTS 3,864,053 A * 2/1975 Harwood ............. B25H 1/0078 33/572
4,257,166 A * 3/1981 Barker .................. B23B 47/287 33/667
4,449,867 A * 5/1984 Dergo ...................... B23B 47/28 408/103
4,842,453 A * 6/1989 Raines .................. B23B 47/287 408/115 R
5,688,284 A * 11/1997 Chervitz ............ A61B 17/1764 606/102
6,217,266 B1 * 4/2001 Bowling ................. B23B 47/28 408/103
7,243,440 B2 * 7/2007 DeKeyser ................. B25C 7/00 175/45
8,986,316 B1 * 3/2015 Jordan ............... A61B 17/1714 606/96
D736,584 S * 8/2015 Larson ............................. D8/71
2016/0121447 A1 * 5/2016 Dembeck ........... B23Q 17/2275 33/638

OTHER PUBLICATIONS

Image capture from Alfra UK Ltd. website showing drilling machines, www.alfra.co.uk/Drilling.htm, downloaded Sep. 19, 2014.
Product literature for an Alfra Rotabest V32 drilling machine, downloaded from www.alfra.co.uk/Manuals/V_32[1].pdf, downloaded Sep. 19, 2014.

(Continued)

*Primary Examiner* — Yaritza Guadalupe-McCall
(74) *Attorney, Agent, or Firm* — DASCENZO Intellectual Property Law, P.C.

(57) ABSTRACT

Drill guides for right angle drills include an elongate base, a fore guide, a fore mount, an aft guide, and an aft mount. The fore mount and the aft mount are configured to be operatively coupled to a right angle drill, and the fore guide and the aft guide are configured to permit selective translation of the right angle drill toward and away from the base.

19 Claims, 4 Drawing Sheets

(56) References Cited

OTHER PUBLICATIONS

Image capture from Harbor Freight Tools website showing a Drill-master angle drill guide, www.harborfreight.com/angle-drill-guide-95622.html, downloaded Sep. 19, 2014.
Image capture from Omega Technologies website showing drill stands, bushings, and kits, www.omegatec.com/egg-cup-drill-stands.aspx, downloaded Sep. 19, 2014.
Image capture from Rockler Woodworking and Hardware website showing a Big Gator V-Drill Guide-Standard, www.rockler.com/big-gator-v-drill-guide-standard, downloaded Sep. 19, 2014.
Image capture from Rockler Woodworking and Hardware website showing a Portable Drill Guide, www.rockler.com/portable-drill-guide, downloaded Sep. 19, 2014.

* cited by examiner

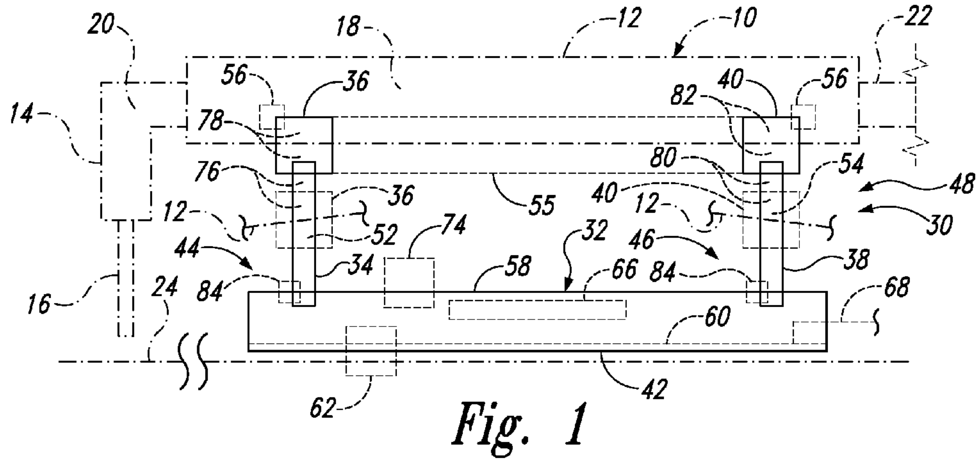
Fig. 1
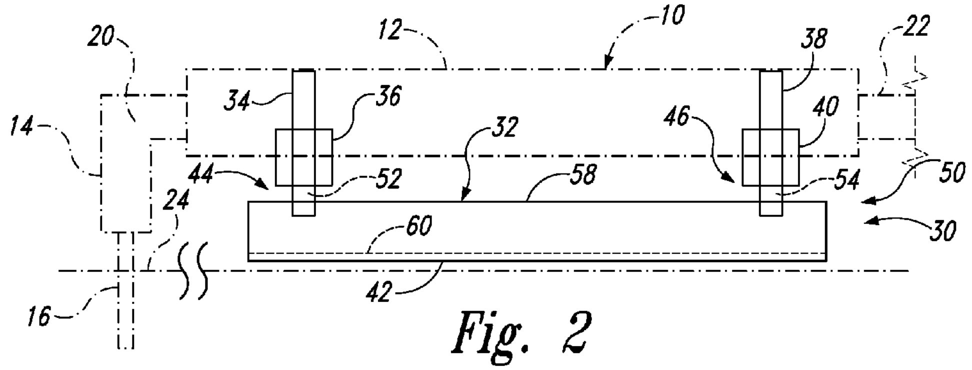
Fig. 2
Fig. 3
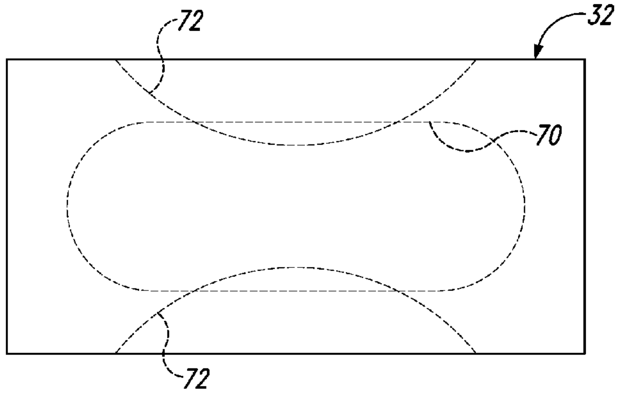
Fig. 4
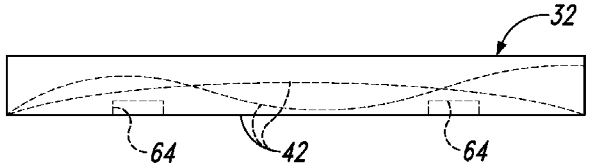

DRILL GUIDES FOR RIGHT ANGLE DRILLS

FIELD

The present disclosure relates to drill guides for right angle drills.

BACKGROUND

Right angle drills are used in a variety of applications, including manufacturing and maintenance of heavy equipment. For example, right angle drills are often used by technicians that manufacture and/or maintain aircraft, land vehicles, marine vehicles, construction equipment, etc. In particular, right angle drills may be useful when working on a work piece in a confined space. Often such confined spaces are difficult and/or awkward to access by a technician. Moreover, in such applications, precise placement of a drill hole, for example, may be critical to a particular application.

SUMMARY

Drill guides according to the present disclosure are configured for use with right angle drills. Disclosed drill guides include an elongate base, a fore guide, a fore mount, an aft guide, and an aft mount. The base includes a base surface for engaging a work piece and has a fore region and an aft region. The fore guide is operatively coupled to and extends from the fore region of the base. The fore mount is operatively coupled to the fore guide for selective translation of the fore mount along the fore guide toward and away from the base. The fore mount is configured to be operatively coupled to the body of the right angle drill proximal the head of the right angle drill. The aft guide is operatively coupled to and extends from the aft region of the base. The aft mount is operatively coupled to the aft guide for selective translation of the aft mount along the aft guide toward and away from the base. The aft mount is configured to be operatively coupled to the body of the right angle drill distal the head of the right angle drill.

BRIEF DESCRIPTION OF THE DRAWINGS

FIG. 1 is a schematic side view representing drill guides according to the present disclosure in a neutral configuration.

FIG. 2 is a schematic side view representing drill guides according to the present disclosure in a drilling configuration.

FIG. 3 is a schematic plan view representing bases of drill guides according to the present disclosure.

FIG. 4 is a schematic side view representing bases of drill guides according to the present disclosure.

DESCRIPTION

Figure 5:
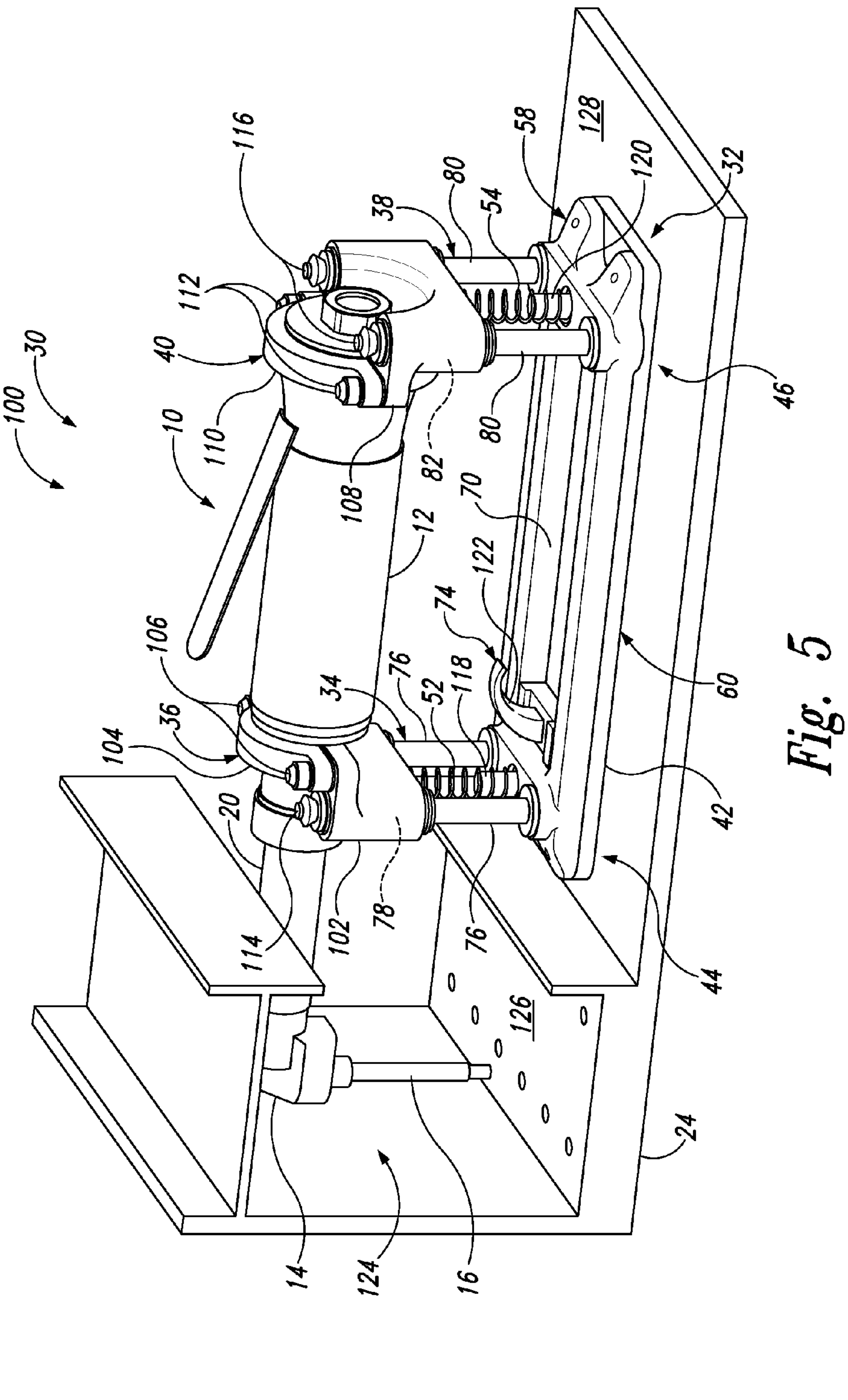
FIG. 5 is an isometric view of an illustrative, non-exclusive example of a drill guide according to the present disclosure shown together with an example right-angle drill and positioned for an example drilling application.

Drill guides for use with right angle drills are disclosed herein, as are specific applications of drill guides, such as in connection with the use of a drill guide in a maintenance or manufacturing environment. Generally, in the figures, elements that are likely to be included in a given example are illustrated in solid lines, while elements that are optional to a given example or that are illustrated for context are illustrated in broken lines. However, elements that are illustrated in solid lines are not essential to all examples of the present disclosure, and an element shown in solid lines may be omitted from a particular example without departing from the scope of the present disclosure.

As used herein, a "right angle drill" 10 is a rotary power tool that includes an elongate body 12 used as a handle, and a drill head, or chuck, 14 that extends at a right angle from the body and that is configured to operatively retain a tool 16, such as a drill bit, a grinder bit, a reamer bit, a sander bit, a countersink bit, a counter bore bit, a polishing bit, or any other suitable rotary bit. Typically, the elongate body 12 houses the motor 18 of the right angle drill, and therefore, an elongate body 12 additionally or alternatively may be described as or referred to as a motor housing 12 with a longitudinal axis of the motor housing also generally defining the axis of rotation of the motor. In such right angle drills, the drill head 14 includes a mechanism 20 for converting the rotational direction of the motor about the motor's axis of rotation to a rotational direction about an axis of the tool 16. Often, right angle drills are pneumatically powered with the motor of the right angle drill motor being configured to be operatively coupled to a source of pressurized air, as schematically indicated at 22; however, right angle drills also may be electrically powered, including with a wired connection to a source of electricity or with batteries, including rechargeable batteries. A right angle drill 10 is different from a so-called "pistol grip" drill, in which the motor and chuck, and thus the rotation of the associated tool, are co-axial with each other, and with the handle of the pistol grip drill being generally perpendicular to the motor and chuck.

In FIGS. 1 and 2, representations of drill guides 30 according to the present disclosure are schematically presented together with a schematic representation of a right angle drill 10 and a work piece 24. As schematically illustrated, drill guides 30 include an elongate base 32, a fore guide 34, a fore mount 36, an aft guide 38, and an aft mount 40.

The elongate base 32 includes a base surface 42 for engaging a work piece 24, and the base may be described as including a fore region 44 and an aft region 46. As used herein, the relative terms "fore" and "aft" correspond to the relative direction of a right angle drill 10 when being used with a drill guide 30. More specifically, the fore direction is generally toward the drill head 14 and the tool 16, when present, and the aft direction is generally away from the drill head and the tool, when present. Accordingly, the fore region 44 and the aft region 46 of the elongate base additionally or alternatively may be described as the forward region 44 and the rear region 46. Moreover, by "elongate" it is meant that the base 32 is generally (but not required to be in all embodiments) longer than wide, with the longitudinal, or long, axis of the base being parallel to a longitudinal axis of the elongate body 12 of a right angle drill 10 when being used with a drill guide 30. Additionally, the term "lateral" corresponds to a direction that is generally transverse or perpendicular to the longitudinal axis of the base and/or the body 12 of a right angle drill 10.

As schematically illustrated in FIGS. 1 and 2, the fore guide 34 is operatively coupled to and extends from the fore region 44 of the base 32, and the aft guide 38 is operatively coupled to and extends from the aft region 46 of the base 32.

As schematically represented in FIGS. 1 and 2, the fore mount 36 is operatively coupled to the fore guide 34 for selective translation of the fore mount 36 along the fore guide 34 toward and away from the base 32, and the fore mount 36 is configured to be operatively coupled to the body 12 of a right angle drill 10 proximal its drill head 14. Similarly, the aft mount 40 is operatively coupled to the aft guide 38 for selective translation of the aft mount 40 along the aft guide 38 toward and away from the base 32, and the aft mount 40 is configured to be operatively coupled to the body 12 of a right angle drill 10 distal its drill head 14. Accordingly, when a right angle drill 10 is operatively coupled to a drill guide 30, a user may grasp the body 12 of the right angle drill 10, selectively position the base surface 42 against a work piece 24 in a desired position, and translate a tool 16 toward, into engagement with, and ultimately into the work piece 24, as schematically represented in FIG. 2. A drill guide 30 therefore may be described as having a neutral configuration 48, as schematically represented in FIG. 1, and a range of drilling configurations 50, such as schematically represented in FIG. 2, with the tool 16 penetrating the work piece 24 and in FIG. 1 with dashed representations of the fore mount 36 and the aft mount 40 between the neutral configuration of FIG. 1 and the drilling configuration of FIG. 2.

In some embodiments of drill guides 30, the fore mount 36 and the aft mount 40 may be spring-biased away from the base 32. In other words, the drill guide may be biased toward its neutral configuration 48. Accordingly, a user may grasp the body 12 of a right angle drill 10 that is operatively coupled to the drill guide 30, place the drill guide 30, and thus the right angle drill 10, in a desired position relative to a work piece 24, actuate the right angle drill 10, and then urge the right angle drill 10 toward the base 32 and against the spring bias of the fore mount 36 and aft mount 40 so that a tool 16 engages and works on the work piece 24.

In some such embodiments, the drill guide 30 may therefore include a fore spring 52 that is associated with the fore mount 36, such as being operatively positioned between the fore mount 36 and the fore region 44 of the base 32. Additionally or alternatively, the drill guide 30 may include an aft spring 54 that is associated with the aft mount 40, such as being operatively positioned between the aft mount 40 and the aft region 46 of the base 32. In FIGS. 1 and 2, the optional fore spring 52 and the optional aft spring 54 are schematically indicated with respective lead lines extending into the schematic representations of the fore guide 34 and the aft guide 38, respectively, schematically representing that the fore spring 52 and the aft spring 54 may be positioned within, adjacent, around, or otherwise associated with the fore guide 34 and the aft guide 38, respectively. The fore spring 52 and the aft spring 54, when present, may take any suitable form such that they operatively bias, or urge, the fore mount 36 and the aft mount 40 away from the base 32. As illustrative, non-exclusive examples, the fore spring 52 and the aft spring 54 may include one or more coil springs, one or more gas cylinders, etc.

As schematically represented in solid boxes in FIGS. 1 and 2, the fore guide 34 and the aft guide 38 may be spaced apart longitudinally from each other. In some embodiments, the fore guide and the aft guide may be spaced apart longitudinally to accommodate a user grasping a body 12 of a right angle drill, optionally without interference with the user's hand. In other words, the fore guide and the aft guide may be spaced apart so that a user's fingers will be able to be positioned between the body 12 of the right angle drill and the base 32 when the user urges the right angle drill toward the base without being pinched or otherwise needing to be removed. As illustrative, non-exclusive examples, the fore guide and the aft guide may be spaced apart longitudinally by one or more of at least 8 centimeters (cm), at least 12 cm, at least 16 cm, at least 20 cm, less than 30 cm, less than 25 cm, less than 20 cm, 8-30 cm, 8-25 cm, 8-20 cm, and/or 8-16 cm.

Similarly, the fore mount 36 and the aft mount 40 may be spaced apart longitudinally from each other, as schematically represented in solid lines in FIGS. 1 and 2. However, as schematically represented in dashed lines in FIG. 1, the fore mount and the aft mount may be connected together such as with an optional body portion 55 that extends between the fore mount and the aft mount adjacent, and optionally in engagement with, the body 12 of a right angle drill 10. Similar to the fore guide and the aft guide, the fore mount and the aft mount may be may be spaced apart to accommodate a user grasping the body of the right angle drill without interference between the mounts and the user's hand. Similarly, illustrative, non-exclusive examples of suitable spacings between the fore mount and the aft mount include one or more of at least 8 cm, at least 12 cm, at least 16 cm, at least 20 cm, less than 30 cm, less than 25 cm, less than 20 cm, 8-30 cm, 8-25 cm, 8-20 cm, and/or 8-16 cm.

In some embodiments of drill guides 30, the fore mount 36 and the aft mount 40 may be configured to be operatively coupled to a right-angle drill 10 so that the body 12 of the right angle drill is parallel to the base 32, including the base surface 42. Accordingly, such a drill guide may be configured to operatively receive a right angle drill so that a corresponding tool 16 is perpendicular to the base surface 42, and thus to a work piece 24, when the base surface is operatively engaged with the work piece. Moreover, the fore guide 34 and the aft guide 38 may be configured to operatively maintain the relative orientation of the right angle drill 10 and a corresponding tool 16 with respect to the base 32 when the right angle drill is translated toward and away from the base responsive to user input.

In some embodiments of drill guides 30, one or more of the base 32, the fore guide 34, the fore mount 36, the aft guide 38, and the aft mount 40 may be configured to permit selective adjustment of an angle of a right angle drill 10, and thus a tool 16, relative to the base 32, and thus adjustment of an angle of a tool 16 relative to a work piece 24. This is schematically represented in FIG. 1 with portions of a body 12 of a right angle drill illustrated with dash-dot lines and associated with the intermediate positions of the fore mount 36 and the aft mount 40.

In some embodiments, as schematically illustrated in FIG. 1, one or both of the fore mount 36 and the aft mount 40 may include a mount feature 56 that is configured to mate with the body 12 of the right angle drill to position the head 14 of the right angle drill in a predefined rotational position relative to the drill guide 30. As an illustrative, non-exclusive example, the mount feature 56 may be operative to ensure that the head 14 of the right angle drill is at a right angle relative to the base surface 42, and thus relative to the work piece 24 to be worked on. As an illustrative, non-exclusive example, the mount feature 56 may be a planar surface that engages a corresponding planar surface of a body 12 of a right angle drill; however, other features also may be incorporated into drill guides 30. In some embodiments, the mount feature 56 may correspond to a specific brand and/or model of right angle drill, such that the mount feature mates with a corresponding feature that is unique to the specific brand and/or model of right angle drill. Additionally or alternatively, the optional mount feature may be configured to permit a user to selectively set a desire rotational position of a right angle drill relative to the base surface 42.

In FIGS. 1 and 2, the fore mount 36 and the aft mount 40 are schematically represented in an overlapping relationship with the body 12 of a right angle drill 10, schematically representing that the fore mount 36 and the aft mount 40 may take any suitable form to secure the body 12 of a right angle drill 10 for operative use of a right angle drill 10 with a drill guide 30. In some embodiments, the fore mount and the aft mount may be configured to be operatively coupled to the body of the right angle drill. In some embodiments, the fore mount and the aft mount may define clamps that are configured to receive and secure the body of the right angle drill to the drill guide.

As schematically illustrated in FIGS. 1 and 2, the base 32 of a drill guide 30 may include a body portion 58 and a contact portion 60 that defines the base surface 42. In some such embodiments, the contact portion 60 may be configured to be selectively coupled to and decoupled from the body portion 58. Accordingly, a contact portion 60 may be replaced if damaged or otherwise worn down due to use. Additionally or alternatively, more than one contact portion 60 may be provided, with each contact portion having different properties suitable for different applications of drill guides 30 and/or suitable for different user preferences, such as amount of friction the base surface 42 provides against a work piece 24. For example, a base surface 42 may be configured to, or selected to, grip smooth aluminum and/or smooth carbon fiber reinforced plastic structures, such as may be used in aerospace applications. As illustrative, non-exclusive examples, a contact portion 60 may be constructed of rubber, nylon, polyoxymethylene, phenolic resin, a polymeric material, a resilient material, a high friction material, and/or a low friction material. Additionally or alternatively, the base 32, including the optional contact portion 60, may include one or more rollers or balls configured to provide a low friction interface between the base 32 and a work piece 24.

Additionally or alternatively, as schematically represented in FIG. 1, the base 32 of a drill guide 30 optionally may include at least one base feature 62 that is configured to mate with a predetermined feature of a work piece 24. As an illustrative, non-exclusive example, the base feature may include or define one or more notches 64 that are sized to receive corresponding one or more rails or other raised features of a work piece, as schematically and optionally illustrated in FIG. 4. While notch 64 is schematically represented as a rectangular notch, other profiles of notches may be used, including triangular, V-shaped, semi-circular, etc. While FIG. 4 schematically illustrates a notch 64 extending laterally across the base 32, one or more notches 64 additionally or alternatively may extend longitudinally across the base 32. Such embodiments of bases may be well suited for operating on (e.g., drilling) a pipe or other elongate work piece 24, for example with a V-notch extending longitudinally along the base and aligned with a tool 16.

As also schematically illustrated in FIG. 4, the base surface may be planar, may be non-planar, may include one or more convex regions, and/or may include one or more concave regions. As an illustrative, non-exclusive example, a base surface 42 having a single concave region may be configured to mate with the outer curvature of a barrel section of an aircraft.

As optionally and schematically illustrated in FIG. 1, the base 32 of a drill guide 30 may include a tool holder 66 that is configured to selectively receive and retain one or more tools 16 for use with right angle drills 10.

In some embodiments, the base 32 of a drill guide 30 may be configured to be operatively coupled to a vacuum source for suctioning the base surface to the work piece, such as schematically represented in FIG. 1 at 68.

Turning now to FIG. 3, the base 32 of a drill guide 30 optionally may define a passage 70 that extends through the base, or at least through the base portion 60 of the base and optionally not through the contact portion 42 of the base. Although not required when present, the optional passage may be elongate and extend longitudinally along the base. Additionally or alternatively, as also schematically illustrated in FIG. 3, the base may define a pair of opposed lateral recesses 72, which also optionally may be elongate and extend longitudinally along the base. In some embodiments when present, the pair of opposed lateral recesses 72 may be defined by the body portion 58 but not by the contact portion 60.

Additionally or alternatively, as schematically represented in FIG. 1, the base 32 of a drill guide 30 optionally may include a user engagement structure 74 that is configured to receive one or more fingers from a user when the user is grasping the body 12 of the right angle drill and that facilitates the user pulling the right angle drill 10 toward the base 32. As illustrative, non-exclusive examples, the optional user engagement structure 74 may be sized to receive one, two, three, or four fingers and may be described as a finger pull, a handle, or a grip. An optional user engagement structure may take any suitable form including rigid structures as well as non-rigid structures such as straps.

The fore guide 34 and the aft guide 38 of a drill guide 30 may take any suitable form such that they operatively guide the translation of the fore mount 36 and the aft mount 40, respectively, toward and away from the base 32 responsive to a user selectively urging a right angle drill 10 toward and away from the base. For example, the fore guide 34 may include one or more fore shafts 76 that are rigidly coupled to and extend from the fore region 44 of the base 32. In such embodiments, the fore mount 36 may define one or more corresponding fore bores 78 through which the one or more fore shafts 76 extend so that the fore mount 36 is configured to selectively slide along the one or more fore shafts 76 to and away from the base 32 responsive to receipt of user force on a right angle drill 10. Similarly, the aft guide 38 may include one or more aft shafts 80 that are rigidly coupled to and extend from the aft region 46 of the base 32. In such embodiments, the aft mount 38 may define one or more corresponding aft bores 82 through which the one or more aft shafts 80 extend so that the aft mount 40 is configured to selectively slide along the one or more aft shafts 80 to and away from the base 32 responsive to receipt of user force on a right angle drill 10.

In some embodiments, as schematically illustrated in FIG. 1, a drill guide 30 also may include a stop feature 84 that is configured to limit the selective translation of the fore mount 36 and/or the aft mount 40 relative to the base 32 and thus translation of a right angle drill 10 relative to the base 32. In some such embodiments, the optional stop feature 84 may be selectively adjustable to permit user selection of a desired distance of translation of the fore mount 36 and/or the aft mount 40 relative to the base 32. In FIG. 1, the optional stop features 84 are schematically represented in overlapping relationship with the base 32 and the respective fore guide 34 and aft guide 38, schematically representing that the stop feature may be coupled to, part of, or integral to the base, the fore guide, and/or the aft guide. Additionally or alternatively, a stop feature 84 may be coupled to, part of, or integral with the fore mount 36 and/or the aft mount 40.

Some drill guides 30 may be provided with a plurality of fore mounts 36 and a plurality of aft mounts 40 that can be selectively interchanged as part of a drill guide. For example, a specific one of the fore mounts and a specific one of the aft mounts may be configured to selectively mate with a predetermined model of right angle drill. For example, different mounts may be provided for different sizes and/or different brands of right angle drills. Accordingly, such mounts may be configured to be selectively coupled to and decoupled from the respective fore guide 34 and aft guide 38 of a drill guide 30.

Additionally or alternatively, some drill guides 30 may be provided with a plurality of fore guides 34 and a plurality of aft guides 38 that can be selectively interchanged as part of a drill guide. For example, the fore and aft guides may have different lengths suitable for different applications of using a right angle drill 10. Accordingly, such fore and aft guides may be configured to be selectively coupled to and decoupled from the base 32 of a drill guide 30.

Additionally or alternatively, some drill guides 30 may be provided with a plurality of elongate bases 32 that can be selectively interchanged as part of a drill guide. For example, the bases may have different configurations of base surfaces, such as different curvatures, to correspond to a specific use of a drill guide 30. Accordingly, such bases may be configured to be selectively coupled to and decoupled from the fore guide 34 and the aft guide 38.

Some drill guides 30 also may include and/or may be configured to be utilized with various functional attachments, such as that are configured to be operatively coupled to the base 32 or other portion of the drill guide. Example attachments include (but are not limited to) an extending fence for drilling holes a set distance from a portion of a work piece and an extending fence for drilling holes in a pattern (e.g., circular or other pattern) relative to a portion of a work piece.

Figure 6:
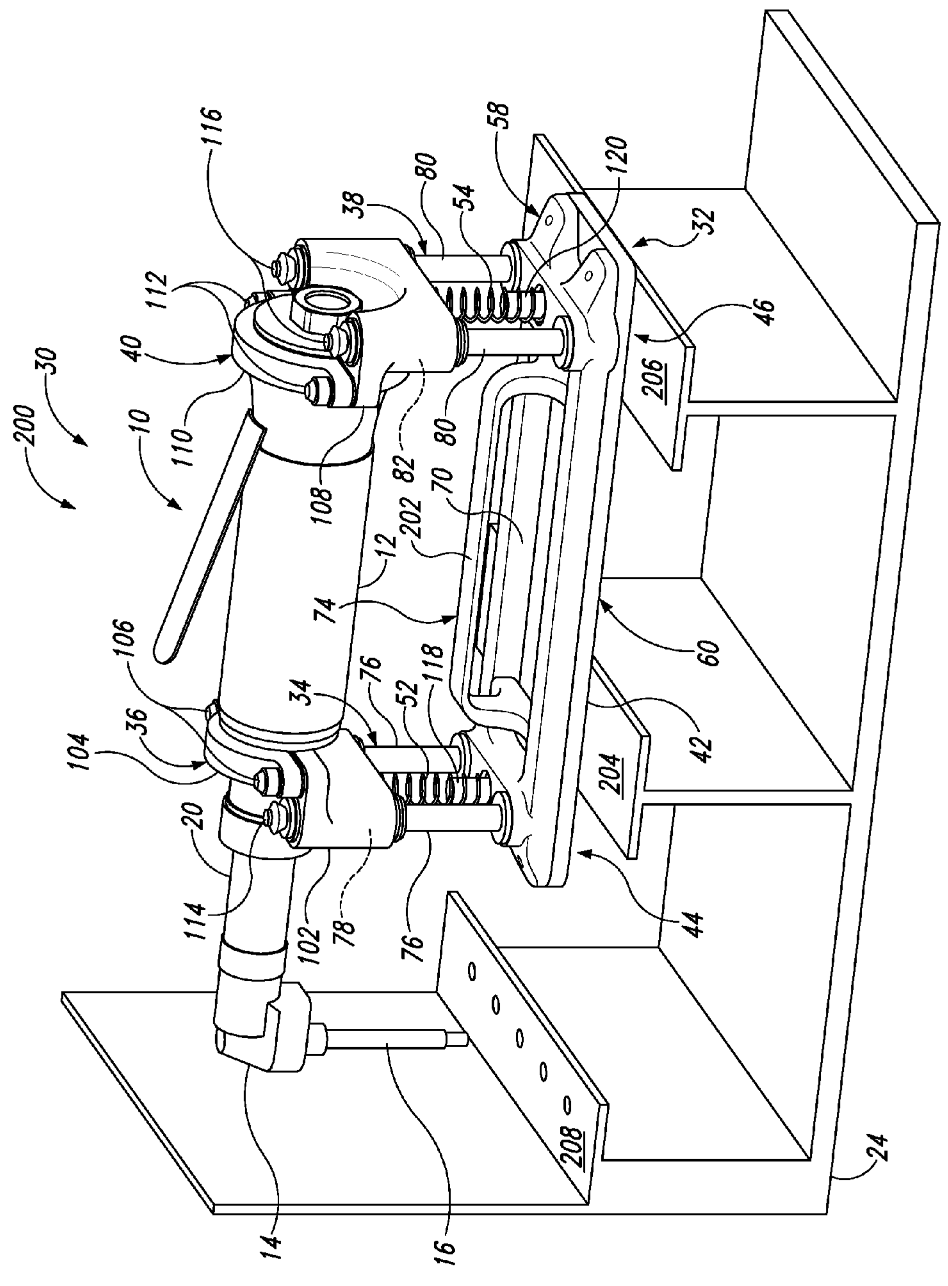
FIG. 6 is an isometric view of another illustrative, non-exclusive example of a drill guide according to the present disclosure shown together with an example right-angle drill and positioned for an example drilling application.
Figure 7:
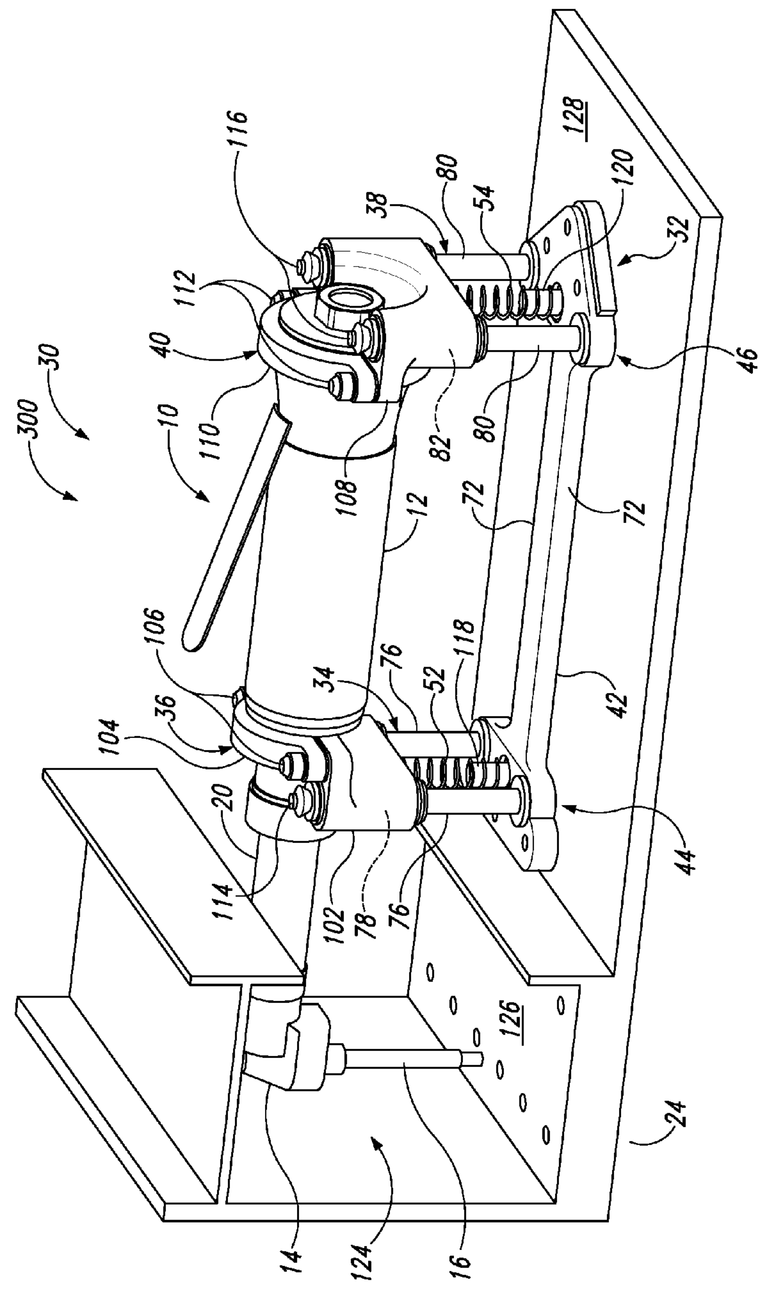
FIG. 7 is an isometric view of another illustrative, non-exclusive example of a drill guide according to the present disclosure shown together with an example right-angle drill and positioned for an example drilling application.

Turning now to FIGS. 5-7, illustrative non-exclusive examples of drill guides 30 are illustrated. Where appropriate, the reference numerals from the schematic illustrations of FIGS. 1-4 are used to designate corresponding parts of the examples of FIGS. 5-7; however, the examples of FIGS. 5-7 are non-exclusive and do not limit drill guides 30 to the illustrated embodiments of FIGS. 5-7. That is, drill guides 30 are not limited to the specific embodiments of FIGS. 5-7, and drill guides 30 may incorporate any number of the various aspects, configurations, characteristics, properties, etc. of drill guides 30 that are illustrated in and discussed with reference to the schematic representations of FIGS. 1-4 and/or the embodiments of FIGS. 5-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 5-7; however, it is within the scope of the present disclosure that the previously discussed features, variants, etc. may be utilized with the examples of FIGS. 5-7.

With reference first to FIG. 5, an illustrative, non-exclusive example of a drill guide 30 is illustrated and referred to herein as a drill guide 100. The fore mount 36 of drill guide 100 includes a lower fore mount portion 102, an upper fore mount portion 104, and a pair of fasteners 106. The upper fore mount portion is configured to be selectively coupled to and decoupled from the lower fore mount portion with the fasteners for selective coupling and decoupling of the body 12 of a right angle drill 10 to and from the fore mount 36. Collectively, the lower fore mount portion 102, the upper fore mount portion 104, and the fasteners 106 may be described as a clamp. Similarly, the aft mount 40 of drill guide 100 includes a lower aft mount portion 108, an upper aft mount portion 110, and a pair of fasteners 112. The upper aft mount portion is configured to be selectively coupled to and decoupled from the lower aft mount portion with the fasteners for selective coupling and decoupling of the body 12 of a right angle drill 10 to and from the aft mount 40. Collectively, the lower aft mount portion 108, the upper aft mount portion 110, and the fasteners 112 may be described as a clamp.

The fore guide 34 of drill guide 100 includes two laterally spaced fore shafts 76, and the lower fore mount portion 102 defines a pair of corresponding fore bores 78 through which the fore shafts extend. Two fasteners 114 are coupled to the upper ends of the fore shafts to define an upper limit of the translation of the lower fore mount portion along the fore shafts. Additionally, the fasteners may be unfastened from the fore shafts to permit for the interchange of differently configured fore mounts 36 and/or fore guides 34. Similarly, the aft guide 38 of drill guide 100 includes two laterally spaced aft shafts 80, and the lower aft mount portion 108 defines a pair of corresponding aft bores 82 through which the aft shafts extend. A pair of fasteners 116 are coupled to the upper ends of the aft shafts to define an upper limit of the translation of the lower aft mount portion along the aft shafts, and these fasteners may be unfastened from the aft shafts to permit for the interchange of differently configured aft mounts 40 and/or aft guides 38.

Drill guide 100 is an example of a dill guide 30 that has a spring-biased fore mount 36 and a spring-biased aft mount 40. As seen in FIG. 5, the base 32 of drill guide 100 includes a fore post 118 extending from the fore region 44 of the base, and a fore spring 52 in the form of a coil spring that is positioned between the fore mount 36 and the fore region 44 of the base with the fore post 118 extending within the lower portion of the coil spring. Accordingly, the fore post serves to operatively maintain an appropriate position of the fore spring respective to the base and the fore mount. Similarly, the base 32 of drill guide 100 includes an aft post 120 extending from the aft region 46 of the base, and an aft spring 54 in the form of a coil spring that is positioned between the aft mount 40 and the aft region 46 of the base with the aft post 120 extending within the lower portion of the coil spring. Accordingly, the aft post serves to operatively maintain an appropriate position of the aft spring respective to the base and the aft mount.

Drill guide 100 also is an example of a drill guide 30 that has a base 32 with a body portion 58 and a contact portion 60 that defines the base surface 42. Moreover, the body portion defines a passage 70 that extends through the body portion but not the contact portion.

Drill guide 100 also is an example of a drill guide 30 that has a base 32 with a user engagement structure 74 in the form of a finger pull 122. The finger pull 122 is positioned toward the fore region 44 of the base 32 and is sized to receive one finger of a user. Accordingly, in operation, a user may engage the finger pull with his/her index finger and when grasping the body 12 of the right angle drill with the rest of his/her hand, may pull on the finger pull to cause the right angle drill, and thus the fore mount 36 and the aft mount 40, to translate toward the base 32 against the bias of the fore spring 52 and the aft spring 54.

In FIG. 5, drill guide 100 is illustrated together with an example right angle drill 10 and an example work piece 24. In particular, the example work piece 24 defines a tight space 124 that would be difficult to work within without use of the drill guide 100. Moreover, the example work piece includes a first planar surface 126 that requires drilling and a second planar surface 128 that is offset from, but parallel to, the first planar surface. Drill guide 100 is not limited to being used with the illustrated example work piece.

With reference now to FIG. 6, another illustrative, non-exclusive example of a drill guide 30 is illustrated, with this example referred to herein as a drill guide 200. Drill guide 200 is configured similar to drill guide 100, except that the optional user engagement structure is in the form of a handle 202. The handle 202 is sized to receive up to four fingers of a user. Accordingly, in operation, a user may grasp the handle with one to four fingers while also grasping the body 12 of the right angle drill 10 with his/her hand and pull on the handle to cause the right angle drill, and thus the fore mount 36 and the aft mount 40, to translate toward the base against the bias of the fore spring 52 and the aft spring 54.

Drill guide 200 is illustrated together with an example right angle drill 10 and an example work piece 24. In particular, the example work piece includes two spaced-apart planar surfaces 204, 206, both of which are spaced apart from a third planar surface 208 to be drilled. The elongate base 32 of the drill guide 200 permits the drill guide to span both planar surfaces 204, 206 for operative positioning of a tool 16 relative to the planar surface 208 to be drilled. Drill guide 200 is not limited to being used with the illustrated example work piece.

With reference now to FIG. 7, another illustrative, non-exclusive example of a drill guide 30 is illustrated, with this example referred to herein as a drill guide 300. Drill guide 300 is configured similar to drill guide 100 and drill guide 200, except that the base 32 defines a pair of opposed lateral recesses 72 and does not include a user engagement structure 74. Drill guide 300 is illustrated together with an example right angle drill 10 and an example work piece 24 identical to the example work piece of FIG. 5. Drill guide 300 is not limited to being used with the illustrated example work piece.

Illustrative, non-exclusive examples of inventive subject matter according to the present disclosure are described in the following enumerated paragraphs:

A. A drill guide for a right angle drill, the drill guide comprising:

an elongate base including a base surface for engaging a work piece, wherein the base has a fore region and an aft region;

a fore guide operatively coupled to and extending from the fore region of the base;

a fore mount operatively coupled to the fore guide for selective translation of the fore mount along the fore guide toward and away from the base, wherein the fore mount is configured to be operatively coupled to the body of the right angle drill proximal the head of the right angle drill;

an aft guide operatively coupled to and extending from the aft region of the base; and an aft mount operatively coupled to the aft guide for selective translation of the aft mount along the aft guide toward and away from the base, wherein the aft mount is configured to be operatively coupled to the body of the right angle drill distal the head of the right angle drill.

A1. The drill guide of paragraph A, wherein the fore mount and the aft mount are spring-biased away from the base.

A2. The drill guide of any of paragraphs A-A1, further comprising:

a fore spring operatively positioned between the fore mount and the fore region of the base, wherein the fore spring biases the fore mount away from the base.

A3. The drill guide of any of paragraphs A-A2, further comprising:

an aft spring operatively positioned between the aft mount and the aft region of the base, wherein the aft spring biases the aft mount away from the base.

A4. The drill guide of any of paragraphs A-A3, wherein the fore guide and the aft guide are longitudinally spaced apart by at least 8 cm, at least 12 cm, at least 16 cm, at least 20 cm, less than 30 cm, less than 25 cm, less than 20 cm, 8-30 cm, 8-25 cm, 8-20 cm, or 8-16 cm.

A5. The drill guide of any of paragraphs A-A4, wherein the fore mount and the aft mount are longitudinally spaced apart by at least 8 cm, at least 12 cm, at least 16 cm, at least 20 cm, less than 30 cm, less than 25 cm, less than 20 cm, 8-30 cm, 8-25 cm, 8-20 cm, or 8-16 cm.

A6. The drill guide of any of paragraphs A-A5, wherein the fore guide and the aft guide and/or the fore mount and the aft mount are longitudinally spaced apart to accommodate a user grasping the body of the right angle drill, optionally without interference with the user's hand.

A7. The drill guide of any of paragraphs A-A6, wherein one or more of the base, the fore guide, the fore mount, the aft guide, and the aft mount are configured to permit selective adjustment of an angle of the right angle drill relative to the base.

A8. The drill guide of any of paragraphs A-A7, wherein at least one of the fore mount and the aft mount includes a mount feature configured to mate with the body of the right angle drill to position the head of the right angle drill in a predefined rotational position relative to the drill guide, optionally wherein the predefined rotational position includes having the head of the right angle drill at a right angle to the base surface.

A9. The drill guide of any of paragraphs A-A8, wherein the fore mount and the aft mount are configured to be operatively coupled to a motor housing of the right angle drill.

A10. The drill guide of any of paragraphs A-A9, wherein the fore mount includes a lower fore mount portion and an upper fore mount portion configured to be selectively coupled to and decoupled from the lower fore mount portion for selective coupling and decoupling of the body of the right angle drill to and from the fore mount.

A11. The drill guide of any of paragraphs A-A10, wherein the aft mount includes a lower aft mount portion and an upper aft mount portion configured to be selectively coupled to and decoupled from the lower aft mount portion for selective coupling and decoupling of the body of the right angle drill to and from the aft mount.

A12. The drill guide of any of paragraphs A-A11, wherein the base includes a body portion and a contact portion that defines the base surface, optionally wherein the contact portion is configured to be selectively coupled to and decoupled from the body portion.

A12.1. The drill guide of paragraph A12, wherein the contact portion is constructed of one of rubber, nylon, polyoxymethylene, phenolic resin, a polymeric material, a resilient material, a high friction material, and a low friction material.

A12.2. The drill guide of any of paragraphs A12-A12.1, further comprising a plurality of contact portions, each contact portion configured to be selectively coupled to and decoupled from the body portion, optionally wherein the plurality of contact portions includes contact portions having base surfaces of varying frictional characteristics.

A13. The drill guide of any of paragraphs A-A12.2, wherein the base surface is configured to grip smooth aluminum and/or smooth carbon fiber reinforced plastic.

A14. The drill guide of any of paragraphs A-A13, wherein the base includes at least one base feature configured to mate with a predetermined feature of the work piece, optionally wherein the predetermined feature is not solely a planar surface.

A15. The drill guide of any of paragraphs A-A14, wherein the base surface is planar.

A16. The drill guide of any of paragraphs A-A14, wherein the base surface is non-planar.

A17. The drill guide of any of paragraphs A-A14, wherein the base surface is convex and/or includes a convex region.

A18. The drill guide of any of paragraphs A-A14, wherein the base surface is concave and/or includes a concave region.

A19. The drill guide of any of paragraphs A-A18, wherein the base includes a tool holder configured to selectively receive and retain one or more tools for use with the right angle drill.

A20. The drill guide of any of paragraphs A-A19, wherein the base is configured to be operatively coupled to a vacuum source for suctioning the base surface to the work piece.

A21. The drill guide of any of paragraphs A-A20, wherein the base defines a passage extending through the base, optionally when depending from paragraph A12 wherein the passage extends through the body portion but not the contact portion, optionally wherein the passage is an elongate passage extending longitudinally along the base.

A22. The drill guide of any of paragraphs A-A21, wherein the base defines a pair of opposed lateral recesses, optionally when depending from paragraph A12 wherein the pair of opposed lateral recesses are defined by the body portion but not the contact portion, optionally wherein the pair of opposed lateral recesses are elongate opposed lateral recesses extending longitudinally along the base.

A23. The drill guide of any of paragraphs A-A22, wherein the base includes a user engagement structure configured to receive one or more fingers from a user when the user is grasping the body of the right angle drill and facilitate the user pulling the right angle drill toward the base.

A23.1. The drill guide of paragraph A23, wherein the user engagement structure is sized to receive one, two, three, or four fingers.

A24. The drill guide of any of paragraphs A-A23.1, wherein the fore guide includes one or more fore shafts (optionally two laterally spaced fore shafts) rigidly coupled to and extending from the fore region of the base, wherein the fore mount defines one or more corresponding fore bores (optionally two laterally spaced fore bores) through which the one or more fore shafts extend, and wherein the fore mount is configured to selectively slide along the one or more fore shafts to and away from the base responsive to receipt of user force on the right angle drill.

A25. The drill guide of any of paragraphs A-A24, wherein the aft guide includes one or more aft shafts (optionally two laterally spaced aft shafts) rigidly coupled to and extending from the aft region of the base, wherein the aft mount defines one or more corresponding aft bores (optionally two laterally spaced aft bores) through which the one or more aft shafts extend, and wherein the aft mount is configured to selectively slide along the one or more aft shafts to and away from the base responsive to receipt of user force on the right angle drill.

A26. The drill guide of any of paragraphs A-A25, further comprising:

a stop feature configured to limit the selective translation of the fore mount and/or the aft mount relative to the base and thus translation of the right angle drill relative to the base, optionally wherein the stop feature is selectively adjustable to permit user selection of a desired distance of translation of the fore mount and/or the aft mount relative to the base.

A26.1. The drill guide of paragraph A26, wherein the stop feature is operatively coupled to and/or is part of one or more of the fore guide, the fore mount, the aft guide, the aft mount, and/or the base.

A27. The drill guide of any of paragraphs A-A26.1, further comprising the right angle drill, wherein the right angle drill is operatively coupled to the fore mount and the aft mount.

A27.1. The drill guide of paragraph A27, further comprising a tool operatively coupled to the right angle drill, optionally wherein the tool includes a drill bit, a grinder bit, a reamer bit, a sander bit, a countersink bit, a counter bore bit, a polishing bit, or any other suitable rotary bit.

A28. The drill guide of any of paragraphs A-A27.1, further comprising:

a plurality of fore mounts and aft mounts, each fore mount and aft mount configured to mate with a predetermined model of right angle drill, wherein the fore mounts and the aft mounts are configured to be selectively coupled to and decoupled from the fore guide and the aft guide.

A29. The drill guide of any of paragraphs A-A28, further comprising:

a plurality of fore guides and aft guides, each fore guide and aft guide having a different length, wherein the fore guides and the aft guides are configured to be selectively coupled to and decoupled from the base.

A30. The drill guide of any of paragraphs A-A29, further comprising:

a plurality of elongate bases, each elongate base having a different base surface, wherein the elongate bases are configured to be selectively coupled to and decoupled from the fore guide and the aft guide.

A31. The drill guide of any of paragraphs A-A30, wherein the fore mount and the aft mount are configured to be operatively coupled to the body of the right angle drill so that the body of the right angle drill is parallel to the base surface, optionally so that a tool associated with the right angle drill is perpendicular to the base surface, and wherein the fore guide and the aft guide are configured to operatively maintain the body of the right angle drill parallel to the base surface when the right angle drill is translated toward and away from the base responsive to user input.

A32. The use of the drill guide of any of paragraphs A-A31, optionally in a manufacturing or maintenance environment, optionally in an aerospace manufacturing or maintenance environment, optionally to machine an aluminum part or a fiber reinforced composite part, optionally in a tight space.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses disclosed herein are not required to all apparatuses according to the present disclosure, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. A drill guide for a right angle drill, the drill guide comprising:

- an elongate base including a base surface for engaging a work piece, wherein the base has a fore region and an aft region;
- a fore guide operatively coupled to and extending from the fore region of the base;
- a fore mount operatively coupled to the fore guide for selective translation of the fore mount along the fore guide toward and away from the base, wherein the fore mount is configured to be operatively coupled to a body of the right angle drill proximal a head of the right angle drill;
- an aft guide operatively coupled to and extending from the aft region of the base; and
- an aft mount operatively coupled to the aft guide for selective translation of the aft mount along the aft guide toward and away from the base, wherein the aft mount is configured to be operatively coupled to the body of the right angle drill distal the head of the right angle drill.

2. The drill guide of claim 1, wherein the fore mount and the aft mount are spring-biased away from the base.

3. The drill guide of claim 1, wherein the fore guide and the aft guide are longitudinally spaced apart by 8-30 cm.

4. The drill guide of claim 1, wherein one or more of the base, the fore guide, the fore mount, the aft guide, and the aft mount are configured to permit selective adjustment of an angle of the right angle drill relative to the base.

5. The drill guide of claim 1, wherein at least one of the fore mount and the aft mount includes a mount feature configured to mate with the body of the right angle drill to position the head of the right angle drill in a predefined rotational position relative to the drill guide.

6. The drill guide of claim 1, wherein the fore mount and the aft mount are configured to be operatively coupled to a motor housing of the right angle drill.

7. The drill guide of claim 1,

- wherein the fore mount includes a lower fore mount portion and an upper fore mount portion configured to be selectively coupled to and decoupled from the lower fore mount portion for selective coupling and decoupling of the body of the right angle drill to and from the fore mount; and
- wherein the aft mount includes a lower aft mount portion and an upper aft mount portion configured to be selectively coupled to and decoupled from the lower aft mount portion for selective coupling and decoupling of the body of the right angle drill to and from the aft mount.

8. The drill guide of claim 1, wherein the base includes a body portion and a contact portion that defines the base surface, wherein the contact portion is configured to be selectively coupled to and decoupled from the body portion.

9. The drill guide of claim 8, further comprising a plurality of contact portions, each contact portion configured to be selectively coupled to and decoupled from the body portion, wherein the plurality of contact portions includes contact portions having base surfaces of varying frictional characteristics.

10. The drill guide of claim 1, wherein the base includes at least one base feature configured to mate with a predetermined feature of the work piece, wherein the predetermined feature is not solely a planar surface.

11. The drill guide of claim 1, wherein the base surface is planar.

12. The drill guide of claim 1, wherein the base surface is non-planar.

13. The drill guide of claim 1, wherein the base includes a tool holder configured to selectively receive and retain one or more tools for use with the right angle drill.

14. The drill guide of claim 1, wherein the base is configured to be operatively coupled to a vacuum source for suctioning the base surface to the work piece.

15. The drill guide of claim 1, wherein the base defines an elongate passage extending longitudinally along and through the base.

16. The drill guide of claim 1, further comprising the right angle drill, wherein the right angle drill is operatively coupled to the fore mount and the aft mount.

17. The drill guide of claim 1, wherein the base includes a user engagement structure configured to receive one or more fingers from a user when the user is grasping the body of the right angle drill and facilitate the user pulling the right angle drill toward the base.

18. The drill guide of claim 1,

- wherein the fore guide includes two laterally spaced fore shafts rigidly coupled to and extending from the fore region of the base, wherein the fore mount defines two laterally spaced fore bores through which the fore shafts extend, and wherein the fore mount is configured to selectively slide along the fore shafts to and away from the base responsive to receipt of user force on the right angle drill; and
- wherein the aft guide includes two laterally spaced aft shafts rigidly coupled to and extending from the aft region of the base, wherein the aft mount defines two laterally spaced aft bores through which the aft shafts extend, and wherein the aft mount is configured to selectively slide along the aft shafts to and away from the base responsive to receipt of user force on the right angle drill.

19. The drill guide of claim 1, wherein the fore mount and the aft mount are configured to be operatively coupled to the body of the right angle drill so that the body of the right angle drill is parallel to the base surface, and wherein the fore guide and the aft guide are configured to operatively maintain the body of the right angle drill parallel to the base surface when the right angle drill is translated toward and away from the base responsive to user input.

* * * * *